No. 627,985. Patented July 4, 1899.
L. P. DELANO.
JOURNAL BEARING.
(Application filed Jan. 21, 1899.)

(No Model.)

Witnesses
W. H. Alexander.
Jessie E. Donnelly.

Inventor
Lewis P. Delano
By Attorneys
Fowler & Fowler

THE NORRIS PETERS CO., PHOTO-LITHO., WASHINGTON, D. C.

UNITED STATES PATENT OFFICE.

LEWIS P. DELANO, OF ST. LOUIS, MISSOURI.

JOURNAL-BEARING.

SPECIFICATION forming part of Letters Patent No. 627,985, dated July 4, 1899.

Application filed January 21, 1899. Serial No. 702,930. (No model.)

*To all whom it may concern:*

Be it known that I, LEWIS P. DELANO, a citizen of the United States, residing at the city of St. Louis, State of Missouri, have invented certain new and useful Improvements in Journal-Bearings, of which the following is such a full, clear, and exact description as will enable any one skilled in the art to which it appertains to make and use the same, reference being had to the accompanying drawings, forming part of this specification.

My invention relates to improvements in journal-bearings, and more particularly to improvements in that class of bearings in which the wearing-surface is composed of two dissimilar metals, preferably arranged in spirally-disposed strips, such as is described in Letters Patent No. 597,429, granted to John Oldendorph January 18, 1898.

One object of my invention is to so construct the bearing that it can be thoroughly and effectively lubricated without waste of oil.

Another object of my invention is to provide means for renewing the wearing-surface of the bearing, thereby saving the expense of machine-work required to fit a new bearing to the bearing-box.

My invention consists in part in providing the wearing-surface of the bearing with one or more oil-grooves extending from a suitable oil-hole around the bearing to carry the oil in the direction of the length of the bearing and returning to the oil-hole, whereby the oil is distributed along the bearing without waste.

My invention also consists in a bearing composed of an outer shell or casing adapted to fit in a suitable journal-box, an inner shell forming part of the wearing-surface, and an intermediate layer of an easily-fusible metal, such as Babbitt metal, holding said shells together and also forming part of the wearing-surface.

Figure 1:
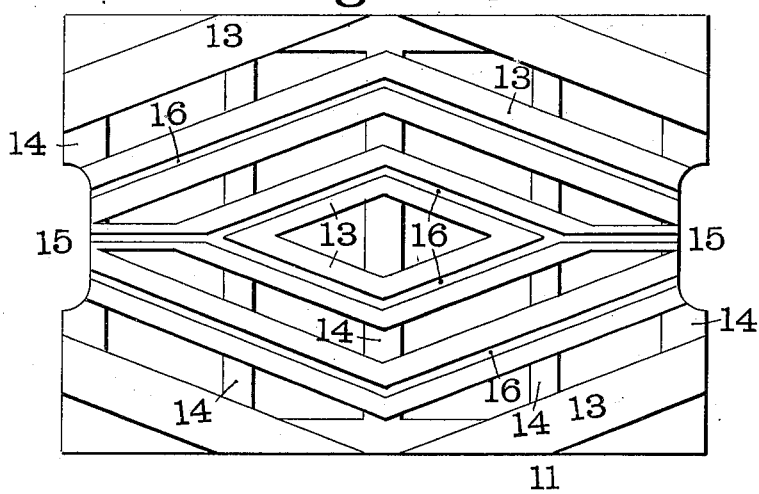
Figure 2:
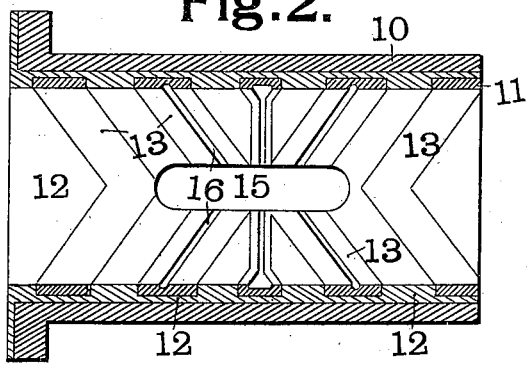
Figure 3:
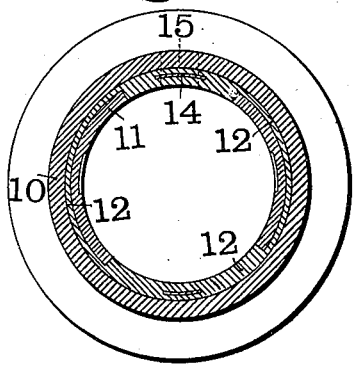
Figure 4:
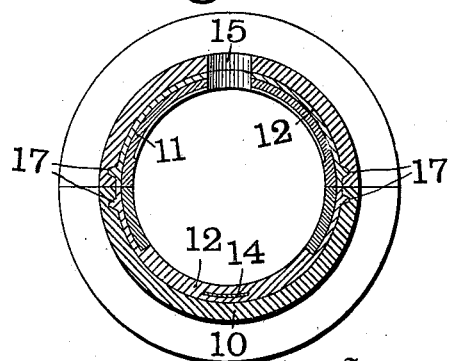

In the accompanying drawings, which illustrate a bearing made in accordance with my invention, Figure 1 is a plan view of a casting adapted to form the inner shell of the bearing. Fig. 2 is a vertical longitudinal section of the bearing, and Figs. 3 and 4 are cross-sections of a one and two part bearing, respectively.

Like marks of reference refer to similar parts in the several views of the drawings.

10 is the outer shell or casing of the bearing and is formed of iron, brass, or other durable metal. The outside of the shell or casing 10 is turned to fit accurately in the journal-box. 11 is the inner shell, which forms part of the wearing-surface of the bearing, and is preferably formed of bronze or similar metal. The shells 10 and 11 are connected by an intermediate layer 12, preferably of a soft and easily-fusible metal, such as Babbitt metal, which also forms part of the wearing-surface of the bearing.

The inner shell 11 is composed of wearing-strips 13 and connecting-strips 14, which are preferably cast integral. The shell 11 may be cast in the form of a plate, as shown in Fig. 1, and bent into the form of a cylinder, or it may be cast in the form of a cylinder, as shown in Fig. 2. Formed in a suitable number of the strips 13, terminating at the oil-hole 15, are oil-grooves 16, which cause the oil to flow from one side of the oil-hole 15 spirally along the bearing and return it to the other side of said oil-hole. In forming the bearing I place the inner shell 11 around a snug-fitting shaft or mandrel surrounded by the outer shell or casing 10, so as to leave a space between the two shells, and then pour into the space melted Babbitt metal 12. The Babbitt metal 12 completely surrounds the connecting-strips 14, thus holding the shell 11 firmly in the shell or casing 10, and also forms the part of the wearing-surface unoccupied by the strips 13. In making a two-part bearing I form near the edges of the parts of the casing 10 grooves 17, as shown in Fig. 4, into which the Babbitt metal 12 flows, and thus prevents the parts of the half-bearings from becoming separated.

In operation oil is supplied to the bearing through the oil-hole 15. The motion of the shaft carries the oil into one end of the grooves 16, distributes it along the bearing, and returns the unused oil to the other side of the oil-hole 15. The shaft may be run in either direction, as the action will be the same, except that the direction of the flow of the oil will be reversed. When the bearing becomes worn, it is removed from the journal-box.

Heat is then applied to it to melt out the Babbitt metal 12. The outer shell or casing 10 can be used to form a new bearing, thus obviating the cost of machine-work, and the materials of the parts 11 and 12 can be remelted. As there is no friction on the casing 10, it is practically indestructible if made of a durable metal.

I am aware that journal-bearings have been provided with oil-grooves either extending from each end to the center, where the oil is discharged, or extending the entire length of the journal. I am also aware that journal-bearings have been formed of perforated sheets of copper secured in place by Babbitt metal cast directly in the journal-box, and therefore I disclaim such constructions.

Having fully described my invention, what I claim as new, and desire to secure by Letters Patent of the United States, is—

1. A journal-bearing having an oil-hole formed therein and one or more oil-grooves formed in the wearing-surface thereof and extending from one side of said oil-hole around and in the direction of the length of the bearing and returning to the other side of said oil-hole.

2. A journal-bearing having its wearing-surface composed of two dissimilar metals, an oil-hole formed therein, one or more strips of one of said metals extending from one side of said oil-hole around and in the direction of the length of the bearing and returning to the other side of said oil-hole, and an oil groove or grooves formed in said strips and conforming thereto.

3. In a journal-bearing, an outer shell or casing for insertion in a journal-box, an inner shell forming part of the wearing-surface, and an intermediate layer of fusible metal holding said shells together and also forming part of the wearing-surface.

In testimony whereof I have hereunto set my hand and affixed my seal in the presence of two subscribing witnesses.

LEWIS P. DELANO. [L. S.]

Witnesses:
A. C. FOWLER,
DAVID STANNARD.